July 9, 1963  L. G. SIMJIAN  3,097,347

SUBSCRIBER CONTROLLED APPARATUS

Filed Sept. 9, 1959  5 Sheets-Sheet 1

INVENTOR.
LUTHER G. SIMJIAN
BY
Ervin B. Steinberg
AGENT

July 9, 1963 L. G. SIMJIAN 3,097,347
SUBSCRIBER CONTROLLED APPARATUS
Filed Sept. 9, 1959 5 Sheets-Sheet 2
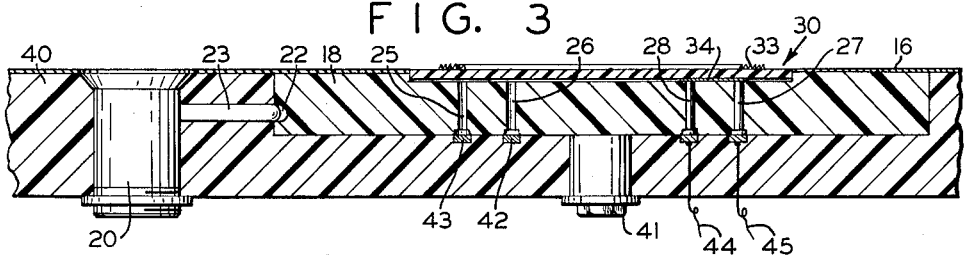
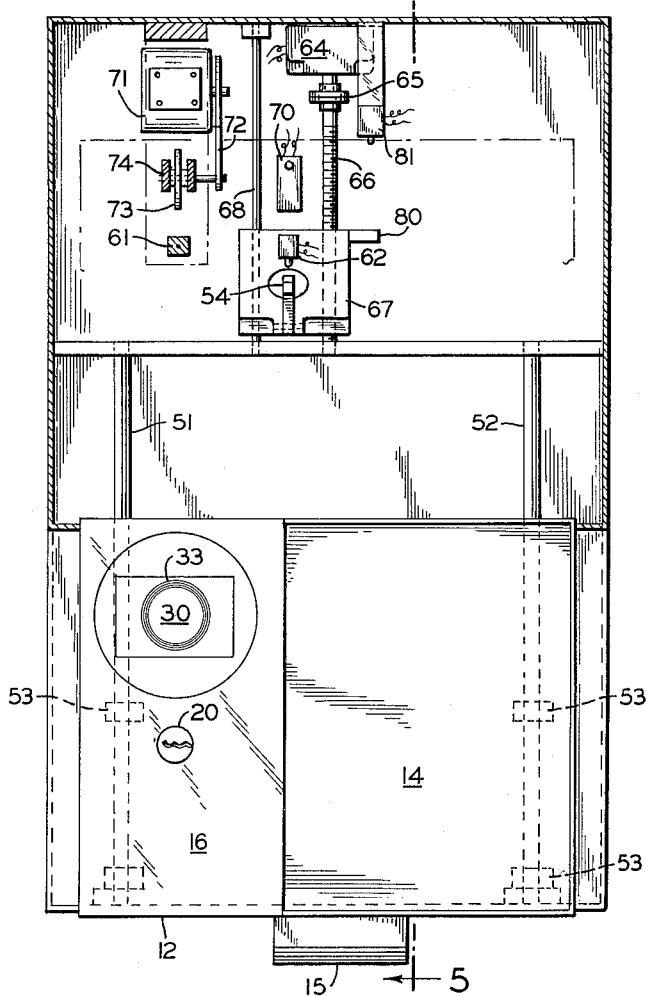
INVENTOR.
LUTHER G. SIMJIAN
BY
AGENT July 9, 1963  L. G. SIMJIAN  3,097,347
SUBSCRIBER CONTROLLED APPARATUS
Filed Sept. 9, 1959  5 Sheets-Sheet 3
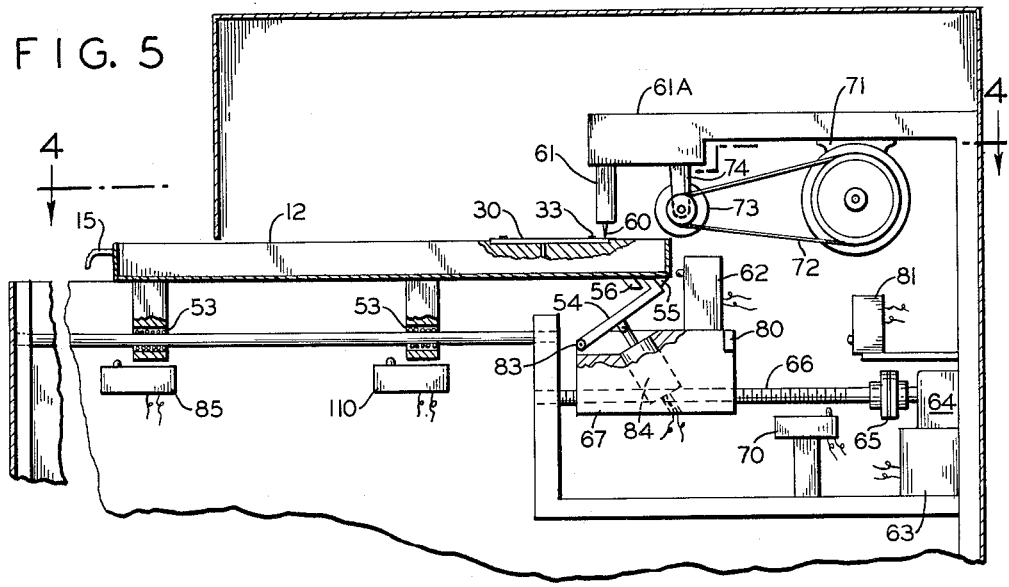
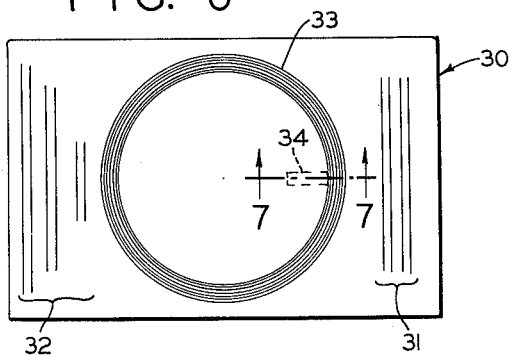
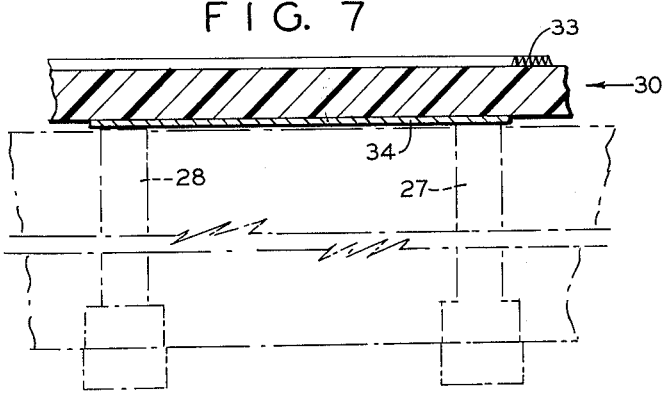
INVENTOR.
LUTHER G. SIMJIAN
BY Ervin B. Steinberg
AGENT July 9, 1963 L. G. SIMJIAN 3,097,347
SUBSCRIBER CONTROLLED APPARATUS
Filed Sept. 9, 1959 5 Sheets-Sheet 4

*INVENTOR.*
LUTHER G. SIMJIAN
BY
Ervin B. Steinberg
AGENT

July 9, 1963 L. G. SIMJIAN 3,097,347
SUBSCRIBER CONTROLLED APPARATUS
Filed Sept. 9, 1959 5 Sheets-Sheet 5

INVENTOR.
LUTHER G. SIMJIAN
BY
Erwin B. Steinberg
AGENT

United States Patent Office 3,097,347
Patented July 9, 1963

3,097,347
SUBSCRIBER CONTROLLED APPARATUS
Luther G. Simjian, Greenwich, Conn., assignor to Universal Match Corporation, St. Louis, Mo., a corporation of Delaware
Filed Sept. 9, 1959, Ser. No. 838,881
11 Claims. (Cl. 340—147)

This invention in general has reference to a subscriber controlled apparatus and more specifically refers to an aparatus which is rendered operative by coded subscriber identification means embodying conditional validity information whereby this validity information is modified by the apparatus after each use.

More particularly, the instant invention concerns an attachment device which is adapted to render a controlled instrumentality or utilization circuit operative upon the receipt of a subscriber identification means which is provided with suitable code means and upon sensing means disposed within the apparatus having established the validity of the identification means for a predetermined period of time. When validity of the identification means has been established, the instrumentality to which the instant attachment device is connected may be rendered operative to accept for instance a deposit, to dispense an article, or perform such other tasks as may be desired.

The instant application is related also to applicant's copending application for U.S. Letters Patent, Serial No. 805,324, filed April 9, 1959, now Patent No. 3,039,582, June 19, 1962, entitled "Subscriber Controlled Apparatus."

One of the salient features of the instant invention relates to means coacting with the apparatus for modifying the validity information on the identification means once the identification means has been used in conjunction with the apparatus so as to render the identification means invalid for excessive or repeated use within the same period of time. By virtue of the present arrangement the privileges accorded to a subscriber are restricted to a single or to a prescribed number of transactions during a specified period of time. Such a period may comprise for instance a day, a week, a month, or a similar unit of time. The same identification means will be valid however during the next succeeding period of time.

A further important feature of the instant apparatus concerns the provision of subscriber identification having an embossed pattern which serves to establish the validity of the identification means. After using the identification means, portions of the embossed pattern become mutilated to prevent reuse of the identification means within the same time interval.

A further feature of this invention resides in the provision of second code information on the identification means which establish a larger unit of time during which the identification means is rendered valid.

A further prominent feature of this invention concerns the provision that the instant arrangement may be expanded to provide a plurality of identical apparatus, each of which can be rendered operative by a single identification means. As soon as the identification means has been used in one of the machines, further use thereof in conjunction with any other machine is restricted.

By providing an identification means which is coded with respect to a prescribed period of use, the apparatus described hereafter is well adapted for such applications as cashing of checks, issuing of articles of value against credit and such other and further transactions as are based on extending of privileges and conditions of mutual trust. Subsequent to its use in combination with the apparatus, the identification means belonging to the subscriber becomes invalidated for use within the same period of time, thus causing the subscriber's privilege to be restricted and the resulting risk to the proprietor of the apparatus to be limited.

While the above is a general outline of the present apparatus, the precise purpose, important and novel features of the present arrangement will be more evident from the ensuing description.

One of the objects of this invention is the provision of a new and improved subscriber controlled apparatus.

Another object of this invention is the provision of a subscriber controlled attachment device which is useful to operate in conjunction with vending machines, access to limited security areas, etc.

Another object of this invention is the provision of a subscriber controlled apparatus which renders a controlled instrumentality operative by sensing a pre-established code embodied on an identification means.

Another object of this invention is the provision of subscriber identification means equipped with an embossed pattern and the further provision of means for sensing the embossed pattern to establish validity thereof.

Another object of this invention is the provision of a subscriber identification means which exhibits along its surface embossings in a predetermined pattern, portions of the embossed pattern being related to predetermined periods of time.

A further object of this invention is the provision of a subscriber identification having an embossed pattern whereby portions of this pattern are engaged by mutilating means after the identification means has been used.

A further object of this invention is the provision of a subscriber controlled identification means which is useable in conjunction with a plurality of identical apparatus.

A further and other object of this invention is the provision of a subscriber identification means which is difficult to duplicate and which after having been rendered invalid for a specified period of time cannot readily be restored in a fraudulent or deceptive manner.

A further and still other object of this invention is the provision of a subscriber controlled apparatus adapted to be rendered operative by identification means normally in the possession of the subscriber, the apparatus permitting actuation of a controlled instrumentality upon sensing means within the apparatus having established the validity of the identification means and wherein still further, the subscriber identification means after having been used is rendered invalid for recurring use within the same specified period of time.

In one form of its embodiments, the subscriber controlled apparatus comprises in combination a subscriber identification means which is equipped with embossings so constructed as to establish the validity of the identification means. Means within the apparatus sense the embossings to determine validity of the identification means. Subsequently, when the embossings have been sensed and the identification means has been found to be valid, a utilization circuit is rendered operative. Finally, mutilating means also provided in the apparatus engage the sensed portion of the embossings to prevent recurring use of the identification means within the identical specified period of time.

Still further and other objects of this invention, together with additional embodiments thereof will be apparent by reference to the following description taken in conjunction with the accompanying drawings in which:

FIGURE 3 is a sectional view along section lines 3—3 in FIGURE 2 with the identification means in place;

FIGURE 4 is a top plan view of the apparatus with the enclosure partly cut away as indicated by section lines 4—4 in FIGURE 5 to reveal the internal parts of the mechanism;

FIGURE 5 is an elevational view, partly in section, along section lines 5—5 in FIGURE 4 with the tray moved to its inward position;

FIGURE 6 is a top plan view at the identification means;

FIGURE 7 is an enlarged view of certain portions of the identification means along section lines 7—7 in FIGURE 6;

Figure 1:
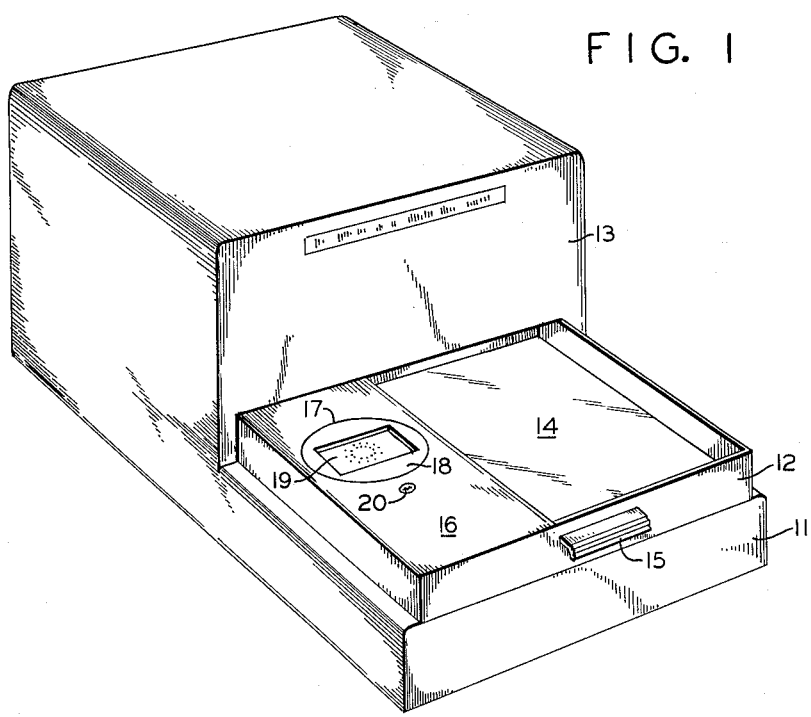
FIGURE 1 is a perspective view of the subscriber controlled apparatus which serves as an attachment to a controlled instrumentality, or to render a utilization circuit operative.

Referring now to the figures and FIGURE 1 in particular, numeral 11 identifies a platform upon which there rests a tray-like structure numeral 12, which is adapted to slide into and out of enclosure 13. As depicted in FIGURE 1, tray 12 is fully extended out of the enclosure 13. Tray 12 is divided longitudinally to provide a depressed portion 14 on its right side for the purpose of conveying an article into the enclosure 13 and/or for issuing an article, such as money, to a subscriber upon the identification means offered by the subscriber having been found valid. Grip 15 serves to move the tray relative to the platform and enclosure. The left longitudinal portion of the tray includes a cover 16 having thereon a circular cutout 17. Within the cutout there is disposed an indexing table 18 which in turn is provided with a rectangular recess 19 adapted to receive the identification means which is normally in the posession of the subscriber.

A lock 20 operable by suitable key means serves to rotatably position the indexing table 18 relative to the cutout.

Figure 2:
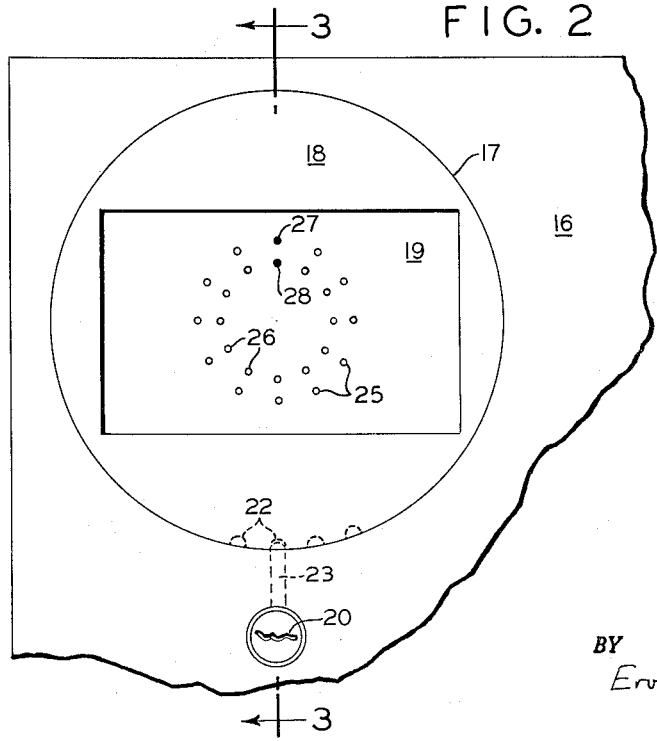
FIGURE 2 is a close-up top plan view of the portion of the apparatus which receives the subscriber identification means.

As seen more clearly in FIGURE 2, indexing table 18 along its periphery is provided with a plurality of spaced radial recesses 22 which are selectively engageable by a pin 23. Pin 23 is moved axially in and out of the recess under control of lock 20. In this manner, indexing table 18, being rotatable about its center, can be rotated and locked in the desired angular position. It will be clearly understood that rotation of table 18 and locking thereof may either be accomplished manually or may be accomplished by automatic timing means in a step-wise fashion as is well known in the art of time clocks commonly used for keeping track of the time of employees.

Rectangular aperture 19 adapted for receiving the identification means is equipped with a plurality of circularly spaced, outer apertures 25 and a similar plurality of inner apertures 26. It will be noted that for each outer aperture there is a corresponding inner aperture. Each of the apertures is adapted to receive selectively a pin contact which is dimensioned to slightly extend above the top surface, the presence of such pin contacts is indicated by numerals 27 and 28 in FIGURE 2. The purpose and placing of these pin contacts 27 and 28 which are adapted to establish contact with an electrically conductive layer on the identification means will be more clearly evident in conjunction with FIGURES 6 and 7.

FIGURE 6 indicates a typical identification means 30 which is adapted to fit into recess 19 of the indexing table. The identification means preferably is made of non-conductive plastic material, for example acetate, and may contain printed subscriber identification data on marginal spaces 31 and 32. Additionally, there is provided an annular pattern of concentric embossings 33 of the type similar to grooves used in conjunction with phonographs. The number of grooves 33 provided on identification means 30 establishes a certain coded pattern which is sensed by suitable sensing means. There may be provided for instance 5, 7, 16 or a similar quantity of concentric grooves. If desired, the presence or absence of embossings in a predetermined space also may serve as a code means and therefore be of significance. On the underside of the identification means there is disposed a small narrow conductive strip 34 which still further serves for the purpose of establishing validity of the identification means for a specified period of time.

FIGURE 7 more clearly indicates the general construction of the identification means and shows on a greatly enlarged scale the embossings 33 protruding from the body of the identification means and the conductive strip 34 on the underside.

Assuming that the identification means 30 is selected to be valid for a period of one month, the position of the conductive strip 34 along the underside denotes the particular calendar month. For a succeeding month the conductive strip will be relocated. Moreover, the indexing table 18 will be selectively adjustable to thirty-one positions, each position denoting one day of the month so that for all practical purposes the circular embossings 33 are divided into thirty-one portions, each portion somewhat more than eleven degrees wide. In order to render the instant apparatus operable, it then is necessary that conductive strip 34 is in proper position, that is, it must engage conductive pins 27 and 28 which have been located previously in such a manner as to correspond to the position of the conductive strip for the specified period of time. Additionally, the presence of the embossed pattern is sensed by sensing means and if found valid the apparatus is rendered operative. Subsequently, the sensed embossed portion is mutilated resulting that the identifying means cannot be used again unless the indexing table has advanced to a new rotary position at which an unused portion of the embossed pattern is disposed underneath the sensing means. The rotary position of the indexing table therefore corresponds to the days of the selected month.

FIGURE 3 shows the identification means positioned on the indexing table 18 which is made of electrically non-conductive material and which is supported for rotation relative to the supporting structure 40 in bearing 41. Pin 23 operated by lock 20 engages recess 22 in the indexing table. Corresponding to the positions of the outer and inner circles of apertures 25 and 26 in FIGURE 2, there is disposed in supporting structure 40 a set of stationary slip rings 42 and 43. Conductive pins 27 and 28 inserted and suitably located in the provided apertures are connected to one another via conductive strip 34 on the identification means. Conductors 44 and 45, permanently fastened to the slip rings, establish connection to the pins.

FIGURES 4 and 5 illustrate the operation of the code sensing means and of the mutilating means which coact with the identification means as indicated heretofore.

Slide 12 is mounted for rearward motion on a set of longitudinal shafts 51 and 52 (FIGURES 4 and 5), each shaft being encircled by a set of axially slidable ball bearings 53. From its outermost position as shown in FIGURE 4, the tray is initially pushed inward under manual control until pawl 54 slides over a protrusion 55 disposed on the underside of tray 12 and comes to rest against stop 56 also disposed at the underside of the tray, see FIGURE 5. Pawl 54 thus is locked between protrusion 55 and stop 56 and the tray no longer can be moved manually either inward or outward from the enclosure. In this position the embossings 33 of the identification means 30 are so disposed that stylus 60 which is adapted to engage the identification means and particularly the embossings 33 is spaced but a small distance from the embossings. Stylus 60 is supported in a stationary holder 61 which extends from supporting frame 61A.

As tray 12 is moved to the described position at which pawl 54 engages and retains the tray, normally open limit switch 62 closes its associated circuit contact to cause energizing of electric motor 63. Motor 63 via gear reducer 64 and coupling 65 turns threaded shaft 66. Shaft 66 engages internally threaded block 67 which is slidably supported and journalled on stationary shaft 68, see FIGURE 4.

As shaft 66 rotates, block 67 slowly moves rearward and very briefly thereafter stylus 60, remaining stationary relative to the tray, engages and traverses the embossings 33 to provide a signal for each embossing or groove sensed to a suitable electrical circuit.

The tray continues to move rearward causing the stylus to leave the embossings and a brief period thereafter, block 67 will close circuit switch 70 which is mounted stationary relative to the moving block 67. Switch 70 in turn closes a circuit to motor 71 which via a belt 72 or other suitable power transmitting means rotates an abrasive wheel 73. Wheel 73 is suspended from stationary support means 74 fastened to frame 61A. The abrasive wheel 73 is so positioned and dimensioned that it will mutilate, that is grind off, the embossed portion previously sensed by the stylus 60 thereby causing the absence of the embossed pattern during reinsertion of the identification means within the same period of time. The width of the abrasive wheel is such that it does not exceed the angular dimension for one time interval as determined by one incremental spacing of the indexing table. The mutilation of the embossings is substantially complete as the tray moves rearward under the influence of motor 63 rotating shaft 66. Finally, when lug 80 attached to block 67 establishes contact with stationary limit switch 81, rearward motion of the tray is stopped by shutting down motor 63 and reversing its direction of rotation. As block 67 slowly moves toward the front, the abrading wheel is shut down as this block moves away from switch 70. Ultimately one of the bearings 53 moving with the tray engages stationary switch 85 which energizes solenoid 84 causing pawl 54 which is mounted for pivotal motion about pin 83 to withdraw from its engagement with the tray. When this has occurred the tray is released and may be moved manually to its outermost position as illustrated in FIGURE 4. Obviously, during the time that the tray was in its innermost position and after stylus 60 sensed the embossings 33, one or a plurality of articles may have been deposited in portion 14 of the tray and thus be now available for acquisition by the user of the instant device.

It will be understood by those skilled in the art that instead of an abrasive wheel 73, other means may be used for mutilating the sensed portion of the embossings such as honing means, cutting means which are adapted to pierce or sever a portion of the embossings, or when the identification means is fabricated from plastic material, heating means combined with pressure means can be brought into contact with the desired portion of the embossed pattern in order to cause its mutilation. Alternately, means for filling the pattern may be substituted or such other means which in a general sense, destroy the pre-established arrangement and effect a faulty reading as will be explained in conjunction with FIGURES 8 and 9.

Figure 10:
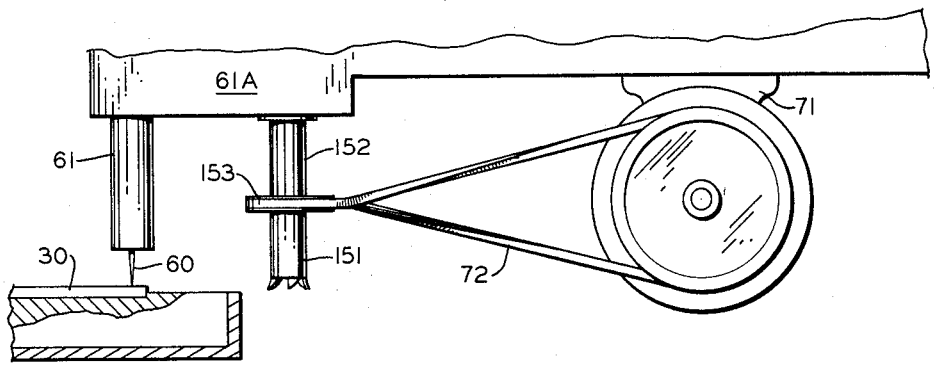
FIGURE 10 is an elevational view showing an alternate embodiment of the mutilating means.

The use of material severing means is illustrated in FIGURE 10 wherein a cutter in the form of a milling tool 151 is fastened to a rotatable bar 152, the latter being suitably mounted for rotation in frame 61A. Bar 152 has fastened to it a pulley 153 which is rotated from motor 71 via flexible belt 72. In this manner the embossed pattern is cut from the remaining card structure. Obviously, in place of a milling tool other severance means, such as a solenoid actuated knife, may be used without deviating from the principle described.

Figure 11:
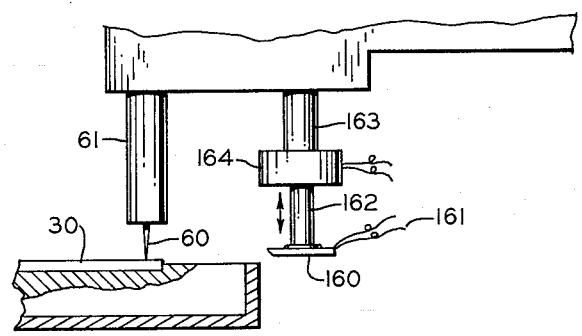
FIGURE 11 is an elevational view depicting a still further and alternative embodiment of the mutilating means.

A solenoid actuated heated tool is shown in FIGURE 11. A horizontal bar 160 having heating wires 161 embedded therein is mounted to a bar 162 and is adapted for vertical reciprocatory motion in shaft 163 under the influence of solenoid 164. Heated bar 160 is normally in its raised position by spring means (not shown) but for mutilating the embossed portion, solenoid 164 is energized to lower heated bar 160 onto the pattern portion sensed by stylus 60.

Figure 8:
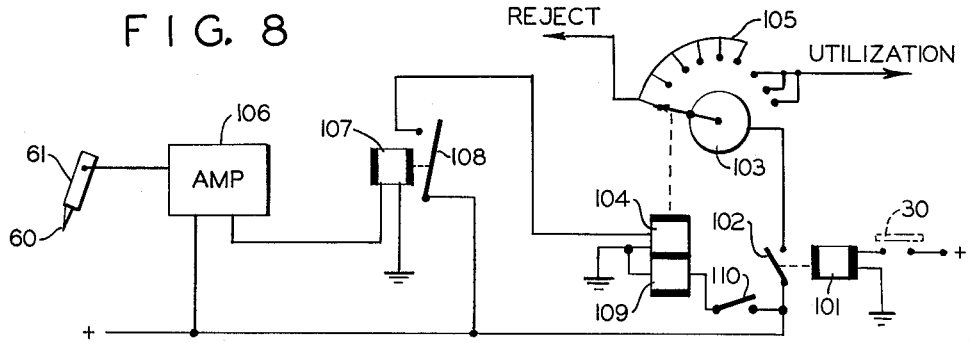
FIGURE 8 is a schematic electrical circuit diagram of the portion which establishes the validity of the identification means by sensing the embossings and other coded features of the identification means.

Referring to FIGURE 8—sensing circuit:

When identification means 30 in the form of a card is placed in recess 19 on tray 12, a circuit is established between conductive strip 34, pins 27 and 28, slip rings 42 and 43, and relay 101. Associated contact 102 closes and applies a voltage to the moving wiper arm 103 of stepping relay 104. As the tray moves the card past the stylus 60, the embossings 33 are sensed and support 61—being phono pickup—produces a signal for each embossed groove. The signal is fed to an amplifier 106 whose output is connected to a keying relay 107 which pulses stepping relay 104 through contact 108. An insufficient number of pulses will cause a reject signal whereas a predetermined number will cause a utilization signal. In this manner the stepping relay acts as a discriminating means, distinguishing between a sufficient and an insufficient number of pulses. Stepping relay is of a type having two coils, one for stepping (104) and one for reset or homing (109). As the tray is moved outward switch 110 is operated by one of the bearings 53 (FIGURE 5) which energizes the homing coil thus resetting the sensing system to the start position. Obviously, the entire system can be rendered so sensitive that only the exact prescribed number of pulses renders the utilization circuit operative. This is readily accomplished by adjusting the contacts on the stepping relay accordingly.

Figure 9:
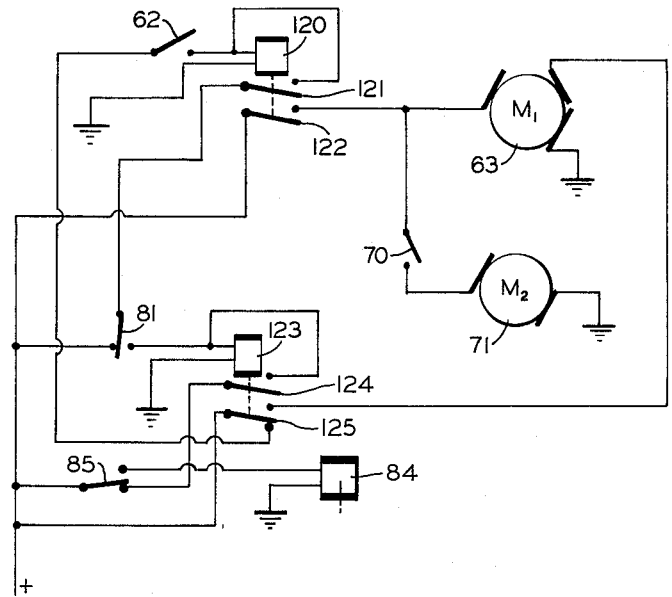
FIGURE 9 is a schematic circuit diagram revealing the operation of other portions of the instant apparatus.

Referring to FIGURE 9—operating circuit:

As heretofore mentioned tray 12 is moved inward manually until pawl 54 latches to the tray between stop 56 and projection 55. At this point switch 62 is engaged which energizes relay 120. Associated contact 121 locks the relay in its energized position through switch 81 while contact 122 applies power to motor 63 causing the tray to move inward at a steady rate, the force being applied via gear reducer 64, coupling 65, threaded shaft 66, internally threaded block 67, pawl 54 and projection 55 on tray 12.

After sensing the card and while the tray is still moving inward, block 67 engages switch 70 causing motor 71 to operate and mutilate the sensed portion of the embossings as previously described. Further motion of the tray causes projection 80 to engage switch 81, causing relay 120 to de-energize thus stopping the rearward motion of the tray, and energizing relay 123 which locks in an energized position through contact 124 and switch 85. Contact 125 removes voltage from switch 62, rendering relay 120 inoperative, and applies the voltage to motor 63 causing it to run in the opposite direction thereby moving the tray outward until bearing 53 engages switch 85 which de-energizes relay 123 and effects stopping of motor 63. At the same time solenoid 84 is energized which as previously described frees the tray so that it again may be moved outward manually.

It will be apparent to those skilled in the art that the circuits described in FIGURES 8 and 9 are illustrative of the principle and embodiment revealed. Obviously, the code information and sensing thereof can readily be combined with the mechanical motion of the tray to sense not only the quantity of the embossings but also their relative position on the identification means as well as with respect to one another.

It furthermore will be understood by those skilled in the art that embossings on the identification means may be arranged longitudinally along the identification means in which event, the rotary indexing table must be replaced by a similar indexing table which is adjustable in longitudinal or transverse position with respect to the tray.

The arrangement of the embossings on the identification means, in a general sense, may be made subject to various modifications and variations to meet individual situations and requirements. The identification means per se readily can assume circular, rectangular, square form, etc. without deviating from the principle described. In a similar manner, the complexity of the conductive strip can be enlarged to provide increased protection. Alternately, concealed magnetic means may be substituted for the same purpose.

Although in accordance with the foregoing illustration the mutilating means is energized regardless whether the dicsriminating means causes a signal to the utilization signal or a reject signal, it will be apparent that switch 70 readily can be interconnected with the signal to the utilization circuit so that motor 71 is activated only in the event that there is a signal flow to this circuit. Such an interconnection comprises a solenoid which becomes energized when a signal flows to the utilization circuit and switch 70 being activated in response to the energized solenoid.

While there have been described and illustrated certain embodiments of the present invention, it will be understood by those skilled in the art that various other modifications and changes may be made without deviating from the principle and intent of the invention which shall be limited only by the scope of the appended claims.

What is claimed is:

1. In an apparatus of the type described the combination of: a subscriber identification means; said identification means equipped with a prearranged substantially uniform extended pattern of embossings; sensing means including a stylus adapted to engage said embossings and produce a signal responsive to the sensed pattern; indexing means cooperating with said sensing means and said identification means for causing said embossed pattern to be divided into portions whereby each portion denotes a preselected time interval and to cause said sensing means to engage one of said embossed portions whose validity is to be sensed during the prevailing period of time; discriminating means connected to said sensing means for receiving therefrom a signal which is responsive to the sensed pattern; a utilization circuit connected to said discriminating means whereby said discriminating means causes said utilization circuit to become operative upon the receipt of signals corresponding to the prearranged pattern, and means mutilating the engaged embossed portion to prevent operation of the utilization circuit during the same selected period of time with said subscriber identification means.

2. In an apparatus of the type described the combination of: a subscriber identification means; said identification means equipped with a prearranged substantially uniform extended pattern of spaced embossings; sensing means adapted to engage and traverse said embossings and produce a signal responsive to the sensed pattern; adjustable indexing means cooperating with said sensing means and said identification means for causing said embossed pattern to be divided into portions whereby each portion denotes a preselected time interval and to cause said sensing means to engage and traverse one of said portions whose validity is to be sensed during the prevailing period of time as determined by the adjustment of said indexing means; discriminating means connected to said sensing means for receiving therefrom a signal which is responsive to the sensed pattern, and means mutilating the sensed and traversed portion of the embossings when the presence of the prearranged pattern has been determined yet leaving undisturbed the remaining portions.

3. In an apparatus of the type described the combination of: a subscriber identification means equipped with a plurality of grooves; sensing means adapted to engage and traverse the grooves to produce an electrical signal responsive to each groove traversed; adjustable indexing means cooperating with said sensing means and said identification means for causing said plurality of grooves to be divided into portions whereby each portion denotes a preselected time interval and to cause said sensing means to engage and traverse one of said portions whose validity is to be sensed during the prevailing period of time as determined by the adjustment of said indexing means; electrical signal responsive means connected to said sensing means and being activated in response to each signal transmitted therefrom whereby said signal responsive means assumes a condition which is responsive to the quantity of signals received, and means mutilating the engaged portion of said grooves to prevent the sensing means to duplicate the first produced electrical signals when caused to re-engage the previously sensed portion.

4. In an apparatus of the type described the combination of: a substantially flat, card like subscriber identification means; said identification means equipped with a prearranged substantially uniform extended pattern of embossings; indexing means coacting with said identification means for dividing said embossed pattern into portions which are disposed to denote preselected time periods during which said card like identification means is valid; sensing means adapted to sense said pattern and being caused by said indexing means to sense one of said portions of said embossings which portion corresponds to the prevailing period of time as determined by the setting of said indexing means; means rendering a utilization circuit operative upon the sensing means sensing the presence of the prearranged pattern on said portion; means mutilating the sensed portion of the embossings when the presence of the prearranged pattern has been determined while leaving undisturbed the remaining portions, and said indexing means including electrically conductive means provided on said identification means whereby said conductive means coact with electrodes in an electrical circuit.

5. In an apparatus of the type described, the combination of:
   subscriber identification means having thereon a prearranged pattern of a plurality of groups of embossings, each of said groups of embossings having an independent code significance;
   indexing means to select one of said groups for read out;
   signal discriminating and utilization means;
   embossing sensing means coupled to said signal discriminating and utilization means for reading out said selected group of embossings and providing code signals representative of said embossings to said signal discriminating and utilization means; and
   mutilating means mutilating said selected group of embossings subsequent to said reading out, thereby precluding subsequent additional reading out of said selected group of embossings and provision of signals representative of said embossings to said signal discriminating and utilization means.

6. In an apparatus of the type described, the combination of:
   subscriber identification means having thereon a prearranged pattern of a plurality of groups of embossings, each of said groups of embossings having an independent code significance;
   signal discriminating means coupled to utilization means;
   embossing sensing and mutilating means coupleed to said signal discriminating means including sensing means for engaging and traversing one of said groups of embossings and providing code signals representative of said engaged group of embossings to said signal discriminating means, and mutilating means for mutilating said engaged group of embossings, thereby precluding subsequent additional provision by said engaging and traversing means of signals having code significance with respect to said engaged and mutilated group of embossings, said mutilation being subsequent to and substantially contemporaneous with said signal provision;

indexing means coupled to said sensing and mutilating means to select said group of embossings;

said signal discriminating means including means for determining whether the provided signals have valid code significance and on determining these signals to be valid, actuating said utilization means for operation.

7. The combination of claim 6 wherein said mutilating means comprises an abrading device.

8. The combination of claim 6 wherein said mutilating means comprises a material severing device.

9. The combination of claim 6 wherein said mutilating means comprises a heat applying device.

10. In an apparatus of the type described, the combination of:

subscriber identification means having thereon a prearranged pattern of a plurality of substantially identical groups of embossings, each of said groups of embossings having an independent code significance;

signal discriminating means coupled to utilization means;

embossing sensing and mutilating means coupled to said signal discriminating means including a stylus means for traversing one of said groups of embossings and providing code signals representative of said traversed group of embossings to said signal discriminating means; and a mutilating means for mutilating said traversed group of embossings, thereby precluding subsequent additional provision by said stylus means of signals having code significance with respect to said traversed and mutilated group of embossings; said mutilation being subsequent and substantially contemporaneous with said signal provision;

indexing means coupled to said sensing and mutilating means to select said group of embossings;

said signal discriminating means including means for determining whether the provided signals have valid code significance and on determining that these signals have a valid code significance, actuating said utilization means for operation.

11. The combination of claim 10 wherein said stylus means traverses only said group of embossings selected by said indexing means, and said mutilating means mutilates only said traversed group of embossings leaving undisturbed the remaining portions.

References Cited in the file of this patent

UNITED STATES PATENTS

| | | |
|---|---|---|
| 2,073,904 | Osteen | Mar. 16, 1937 |
| 2,914,746 | James | Nov. 24, 1959 |
| 2,931,953 | Barney | Apr. 5, 1960 |
| 2,967,916 | Williams | Jan. 10, 1961 |
| 3,015,087 | Gorman | Dec. 26, 1961 |